(12) United States Patent
Swartz et al.

(10) Patent No.: US 10,494,276 B2
(45) Date of Patent: Dec. 3, 2019

(54) ELECTROLYTIC CARTRIDGE, SYSTEMS AND METHODS OF USING SAME

(71) Applicant: Spraying Systems Co., Wheaton, IL (US)

(72) Inventors: James B Swartz, Noblesville, IN (US); James I Moyer, Kokomo, IN (US); John Hazelwood, Anderson, IN (US); James D Rossom, Carmel, IN (US)

(73) Assignee: Spraying Systems Co., Wheaton, IL (US)

( * ) Notice: Subject to any disclaimer, the term of this patent is extended or adjusted under 35 U.S.C. 154(b) by 183 days.

(21) Appl. No.: 15/548,513

(22) PCT Filed: Feb. 4, 2016

(86) PCT No.: PCT/US2016/016563
§ 371 (c)(1),
(2) Date: Aug. 3, 2017

(87) PCT Pub. No.: WO2016/126940
PCT Pub. Date: Aug. 11, 2016

(65) Prior Publication Data
US 2018/0016164 A1    Jan. 18, 2018

Related U.S. Application Data

(60) Provisional application No. 62/111,980, filed on Feb. 4, 2015.

(51) Int. Cl.
*C02F 1/46*      (2006.01)
*C02F 1/461*     (2006.01)
(Continued)

(52) U.S. Cl.
CPC .......... *C02F 1/4618* (2013.01); *C02F 1/4674* (2013.01); *C02F 1/4693* (2013.01);
(Continued)

(58) Field of Classification Search
CPC .... C02F 1/4618; C02F 1/4693; C02F 1/4674; C02F 2201/007; C02F 2201/006; C02F 2201/46115
See application file for complete search history.

(56) References Cited

U.S. PATENT DOCUMENTS 4,276,146 A    6/1981  Coker et al.
4,344,633 A    8/1982  Niksa
(Continued)

OTHER PUBLICATIONS

International Search Report dated Jun. 9, 2016, in International Patent Application No. PCT/US2016/016563.

*Primary Examiner* — Arun S Phasge
(74) *Attorney, Agent, or Firm* — Leydig, Voit & Mayer, Ltd.

(57) ABSTRACT

Electrolytic cartridges for, systems for, and methods of electrolyzing a brine solution of water and an alkali salt to produce acidic electrolyzed water and alkaline electrolyzed water are provided. The system includes an internal chamber for receiving the brine solution and at least two electrolytic cartridges immersed in a brine bath. Each electrolytic cartridge includes an electrode, an ion selective membrane disposed on a side of the electrode so as to define a space adjacent to at least a portion of the electrode, a permeable insert covering the ion selective membrane on a side opposite the space, and a bonding plate disposed on the permeable insert on a side opposite the side facing the ion selective membrane. The methods recycle at least a portion of alkaline electrolyzed water into the feed of a cartridge having a positively charged electrode.

18 Claims, 9 Drawing Sheets

(51) Int. Cl.
*C25B 9/08* (2006.01)
*C02F 1/467* (2006.01)
*C02F 1/469* (2006.01)
*C02F 1/66* (2006.01)

(52) U.S. Cl.
CPC .......... *C25B 9/08* (2013.01); *C02F 1/66* (2013.01); *C02F 2001/46157* (2013.01); *C02F 2201/004* (2013.01); *C02F 2201/006* (2013.01); *C02F 2201/007* (2013.01); *C02F 2201/4618* (2013.01); *C02F 2201/46115* (2013.01)

(56) References Cited

U.S. PATENT DOCUMENTS

| | | |
|---|---|---|
| 4,610,765 A | 9/1986 | Beaver et al. |
| 5,599,438 A | 2/1997 | Shiramizu et al. |
| 5,997,717 A * | 12/1999 | Miyashita ............ C02F 1/4618 204/252 |
| 6,117,286 A | 9/2000 | Shimamune et al. |
| 7,967,958 B2 | 6/2011 | Sano |
| 2010/0044241 A1 | 2/2010 | Pendleton et al. |
| 2011/0259760 A1 | 10/2011 | Swartz et al. |
| 2012/0118743 A1 | 5/2012 | Liang |
| 2013/0146473 A1 | 6/2013 | Lambert |
| 2014/0138256 A1 | 5/2014 | Deslandes |
| 2014/0202872 A1 | 7/2014 | Swartz et al. |
| 2014/0246308 A1 | 9/2014 | Lim |

\* cited by examiner

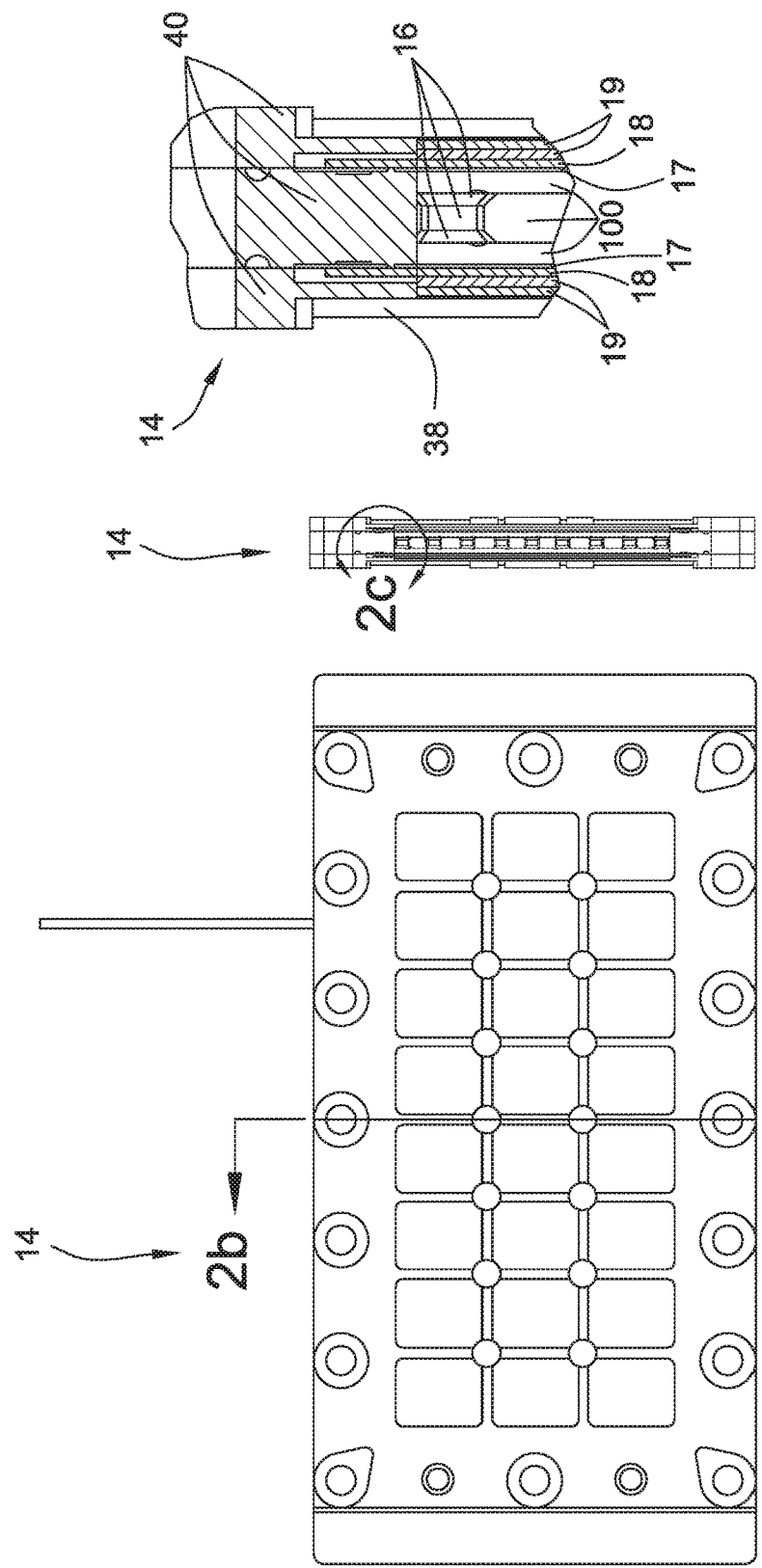

ELECTROLYTIC CARTRIDGE, SYSTEMS AND METHODS OF USING SAME

CROSS-REFERENCE TO RELATED APPLICATIONS

This patent application claims the benefit of U.S. Provisional Patent Application No. 62/111,980, filed Feb. 4, 2015, which is incorporated by reference.

BACKGROUND OF THE INVENTION

Systems are known that electrolyze water containing alkali salts to produce acidic electrolyzed water and alkaline electrolyzed water. Acidic electrolyzed water, which typically has a pH between about 2.0 and about 3.5, generally comprises a disinfectant that is increasingly used in a variety of sanitizing applications including in the medical, agricultural and food processing industries and in other institutional environments. The alkaline or basic electrolyzed water also has a disinfecting as well as a detergent effect and is useful in cleaning oil and grease stains. Sodium chloride is commonly used as the alkali salt that is dissolved in the water because it produces acids and bases that are environmentally friendly, potent and low in cost.

Certain commercially available water electrolyzing systems are assembled "dry," which can lead to wrinkling of the ion selective membrane(s) utilized with the systems. When present, the wrinkled membrane(s) causes increased electrical resistance in the electrolytic production of acidic electrolyzed water and alkaline electrolyzed water. In order to maintain production output for the system, the operator must increase voltage to maintain the electrical current at the increased resistance.

Another concern of using certain commercially available water electrolyzing systems arises from the pH of the acidic electrolyzed water, typically from about pH 2 to about pH 3.5. The acidic electrolyzed water at the typical pH range tends to limit the concentration of the disinfectant in the acidic electrolyzed water. Operating a certain commercially available water electrolyzing system supplied with softened water that was initially reasonably "hard," e.g., contained a reasonably high concentration of soluble calcium and/or magnesium, tends to provide the system with a buffered water supply, which can sometimes provide a beneficial pH for producing acidic electrolyzed water having an optimum concentration of disinfectant. However, the beneficial results generally are not achieved if the water is initially reasonably soft.

Users would prefer to have a system that produces aqueous acidic solution and aqueous alkaline solution that requires the least amount of energy input (i.e., direct current voltage) into the system. In order to lower the energy input, the system should attempt to minimize the electrical resistance while maintaining adequate electrical current to produce the desired amount or concentration of aqueous acidic solution and/or aqueous alkaline solution.

OBJECTS AND SUMMARY OF THE INVENTION

An electrolytic cartridge is provided. The electrolytic cartridge comprises an electrode that is connectable to an electrical supply. An ion selective membrane is disposed on a side of the electrode so as to define a space adjacent to at least a portion of the electrode. A permeable insert covers the ion selective membrane on a side opposite the space. A bonding plate is disposed on the permeable insert on a side opposite the side facing the ion selective membrane. The space is in communication with a fresh water supply at an inlet of the space and in communication with an outlet of the space. The space is sealed such that, when the electrolytic cartridge is submerged in a brine solution comprising ions, the only path for the ions of the brine solution to enter the space is through the ion selective membrane.

An electrolyzing system for electrolyzing a brine solution of water and ions of an alkali salt to produce acidic electrolyzed water and alkaline electrolyzed water is provided. The system comprises a basin comprising an internal chamber for containing the brine solution, which comprises cations and anions, and defining a brine bath. A first electrolytic cartridge is arranged in the internal chamber of the basin with the first electrolytic cartridge immersed in the brine bath. The first electrolytic cartridge comprises a first electrode that is connected to an electrical supply that positively charges the first electrode. An anion selective membrane is disposed on a side of the first electrode so as to define a first space adjacent to at least a portion of the first electrode and into which anions from the brine solution can enter through the anion selective membrane. A permeable insert covers the anion selective membrane on a side opposite the first space. A bonding plate is disposed on the permeable insert on a side opposite the side facing the anion selective membrane. The first space is in communication with a fresh water supply at an inlet of the first space and in communication with an outlet of the first space. The first space is sealed from the brine bath such that the only path for the anions of the brine solution to enter the first space is through the anion selective membrane. A second electrolyte cartridge is arranged in the internal chamber of the basin with the second electrolytic cartridge immersed in the brine bath. The second electrolytic cartridge comprises a second electrode that is connected to an electrical supply that negatively charges the second electrode. A cation selective membrane is disposed on a side of the second electrode so as to define a second space adjacent to at least a portion of the second electrode and into which cations from the brine solution can enter through the cation selective membrane. A permeable insert covers the cation selective membrane on a side opposite the second space. A bonding plate is disposed on the permeable insert on a side opposite the side facing the cation selective membrane. The second space is in communication with a fresh water supply at an inlet of the second space and in communication with an outlet of the second space. The second space is sealed from the brine bath such that the only path for the cations of the brine solution to enter the second space is through the cation selective membrane.

A method of producing acidic electrolyzed water and alkaline electrolyzed water from a brine solution comprising cations and anions is provided. The method comprises immersing a first electrolytic cartridge, a second electrolytic cartridge, and a cathode cartridge in the brine solution. The first electrolytic cartridge comprises a first electrode connected to an electrical supply that positively charges the first electrode. The first electrolytic cartridge further comprises an anion selective membrane that is supported relative to the first electrode so as to define a first space adjacent to at least a portion of the first electrode. The first space is sealed from the brine solution such that the only path for the anions of the brine solution to enter the first space is through the anion selective membrane. The second electrolytic cartridge comprises a second electrode connected to an electrical supply that negatively charges the second electrode. The second electrolytic cartridge further comprises a cation selective membrane that is supported relative to the second electrode so as to define a second space adjacent to at least a portion of the second electrode. The second space is sealed from the brine solution such that the only path for the cations of the brine solution to enter the second space is through the cation selective membrane. The cathode cartridge, which is also an electrolytic cartridge, comprises a third electrode connected to an electrical supply that negatively charges the third electrode. The cathode cartridge further comprises a cation selective membrane that is supported relative to the third electrode so as to define a third space adjacent to at least a portion of the third electrode. The third space is sealed from the brine solution such that the only path for the cations of the brine solution to enter the third space is through the cation selective membrane. Fresh water is flowed through the first, second, and third spaces while the first, second, and third electrodes are charged, thereby creating a first product, a second product, and a third product flowing from each respective space. At least a portion of the third product is flowed through the first space while at least the first and second electrodes are charged, thereby adjusting the pH of the first product.

Yet another method is provided. The method comprises producing aqueous alkaline solution via an electrolytic cartridge submerged in a brine solution and having a negatively charged electrode. At least a portion of the aqueous alkaline solution produced by the electrolytic cartridge having the negatively charged electrode is fed to an electrolytic cartridge submerged in the brine solution and having a positively charged electrode. Aqueous hypochlorous acid solution having a pH of from about 4 to about 6 is produced via the electrolytic cartridge submerged in the brine and having the positively charged electrode.

BRIEF DESCRIPTION OF THE DRAWINGS

FIG. 2a is a front view of an assembled electrolytic cartridge according to the invention.

FIG. 2b is a cross-sectional side view of the assembled electrolytic cartridge of FIG. 2a.

FIG. 2c is a detailed view of the cross-section of the side view of the assembled electrolytic cartridge of FIGS. 2a and 2b.

DETAILED DESCRIPTION OF THE PREFERRED EMBODIMENTS

Figure 1:
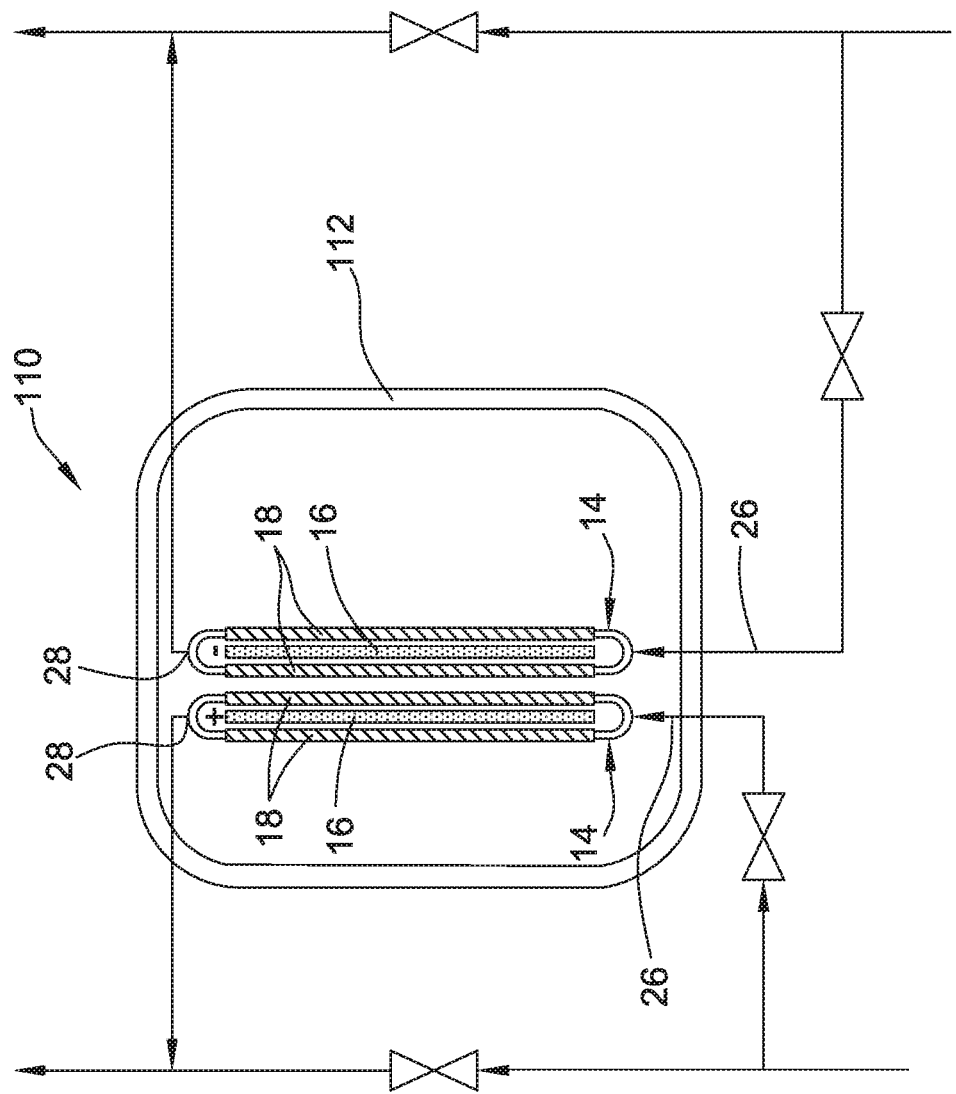
FIG. 1 is a schematic drawing of an exemplary electrolyzing system according to the present invention.

While embodiments encompassing the general inventive concepts may take various forms, there is shown in the drawings and will hereinafter be described various illustrative and preferred embodiments with the understanding that the present disclosure is to be considered an exemplification and is not intended to be limited to the specific embodiments.

An electrolytic cartridge is provided. The electrolytic cartridge comprises an electrode that is connectable to an electrical supply. An ion selective membrane is disposed on a side of the electrode so as to define a space adjacent to at least a portion of the electrode. A permeable insert covers the ion selective membrane on a side opposite the space. A bonding plate is disposed on the permeable insert on a side opposite the side facing the ion selective membrane. The space is in communication with a fresh water supply at an inlet of the space and in communication with an outlet of the space. The space is sealed such that, when the electrolytic cartridge is submerged in a brine solution comprising ions, the only path for the ions of the brine solution to enter the space is through the ion selective membrane.

An electrolyzing system for electrolyzing a brine solution of water and ions of an alkali salt to produce acidic electrolyzed water and alkaline electrolyzed water is provided. The system comprises a basin comprising an internal chamber for containing the brine solution, which comprises cations and anions, and defining a brine bath. A first electrolytic cartridge is arranged in the internal chamber of the basin with the first electrolytic cartridge immersed in the brine bath. The first electrolytic cartridge comprises a first electrode that is connected to an electrical supply that positively charges the first electrode. An anion selective membrane is disposed on a side of the first electrode so as to define a first space adjacent to at least a portion of the first electrode and into which anions from the brine solution can enter through the anion selective membrane. A permeable insert covers the anion selective membrane on a side opposite the first space. A bonding plate is disposed on the permeable insert on a side opposite the side facing the anion selective membrane. The first space is in communication with a fresh water supply at an inlet of the first space and in communication with an outlet of the first space. The first space is sealed from the brine bath such that the only path for the anions of the brine solution to enter the first space is through the anion selective membrane. A second electrolyte cartridge is arranged in the internal chamber of the basin with the second electrolytic cartridge immersed in the brine bath. The second electrolytic cartridge comprises a second electrode that is connected to an electrical supply that negatively charges the second electrode. A cation selective membrane is disposed on a side of the second electrode so as to define a second space adjacent to at least a portion of the second electrode and into which cations from the brine solution can enter through the cation selective membrane. A permeable insert covers the cation selective membrane on a side opposite the second space. A bonding plate is disposed on the permeable insert on a side opposite the side facing the cation selective membrane. The second space is in communication with a fresh water supply at an inlet of the second space and in communication with an outlet of the second space. The second space is sealed from the brine bath such that the only path for the cations of the brine solution to enter the second space is through the cation selective membrane.

Referring to FIG. 1 of the drawings, there is shown an illustrative embodiment of an electrolyzing system 110 constructed in accordance with the teachings of the present invention. The illustrated electrolyzing system 110 is operable to electrolyze a solution of water and an alkali salt to produce acidic electrolyzed water and/or alkaline (i.e., base) electrolyzed water. Both acidic electrolyzed water (i.e., acid sanitizer) and alkaline electrolyzed water (i.e., base cleaner) have beneficial disinfecting and cleansing properties making them useful in a variety of applications including medical, agricultural, food processing and institutional. According to one embodiment, the water and salt solution is a saline or brine solution comprising water and sodium chloride. Depending on the process conditions, electrolysis of a brine solution comprising water and sodium chloride produces aqueous hypochlorous acid solution (e.g., an acid sanitizer) and aqueous sodium hydroxide solution (e.g., a base cleaner), each being an aqueous chemical solution. Note that, though FIG. 1 has been drawn to show the fluids flowing to and from cartridges 14 through the walls of and outside of brine bath 112, such fluid will generally flow through flexible conduits (e.g., hoses) that are arranged such that the hoses will enter or exit, when necessary, via a top opening of brine bath 112.

In accordance with an aspect of the present invention, the electrolyzing system 110 incorporates brine bath 112 into which at least one electrolytic cartridge 14 having a positively charged electrode 16 and at least one electrolytic cartridge 14 having a negatively charged electrode 16 are immersed in brine, with substantially all sides of cartridges 14 open to the brine. As used herein, an electrolytic cell consists of a pair of electrolytic cartridges 14, with one electrolytic cartridge 14 having a positively charged electrode 16 and the other electrolytic cartridge 14 having a negatively charged electrode 16. The use of an open brine bath 112 with immersed electrolytic cartridges 14 eliminates the need for any obstructive intermediate chamber thereby allowing fluid to flow more freely through the system. It also eliminates the need for complex guides to direct the flow of fluid thereby simplifying the design as well as increasing efficiency. Arranging membranes 18 on each side of each electrode 16 allows ions to be drawn into cartridge 14 from both sides of each electrode 16.

Each of electrolytic cartridges 14 has a fresh water inlet 26 (i.e., inlet of the space) that is connected to a supply of fresh water that is directed into space 100 (e.g., FIG. 2) in cartridge 14 between membranes 18 and electrode 16. In cartridge 14, the fresh water mixes with the ions drawn into space 100 (e.g., FIG. 2) of the cartridge 14 to form either aqueous acidic solution (in the cartridge 14 with the positively charged electrode 16) or aqueous alkaline solution (in the cartridge 14 with the negatively charged electrode 16). Each cartridge 14 has outlet 28 that is connected to a line allowing the respective aqueous chemical solutions (aqueous acidic solution or aqueous alkaline solution) to exit cartridges 14. The flow of the brine, fresh water and aqueous chemical solutions through the system can be controlled as known by those skilled in the art.

Figure 2:
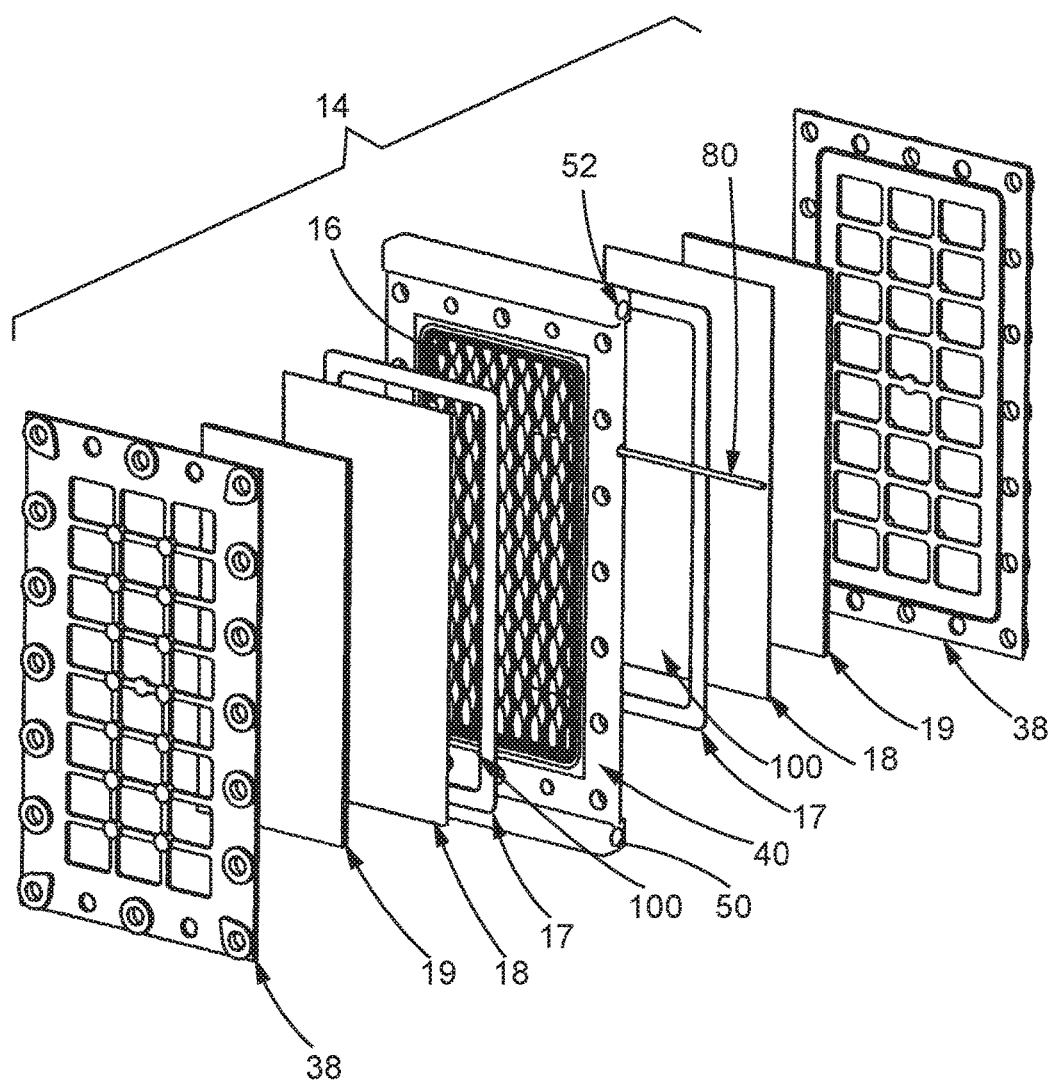
FIG. 2 is an exploded view of an electrolytic cartridge according to the present invention.

Referring now to FIG. 2 of the drawings, there is shown an illustrative embodiment of an exploded view of an electrolytic cartridge 14 constructed in accordance with the teachings of the present invention. Electrolytic cartridge 14 of FIG. 2 comprises electrode 16 supported by housing 40. In certain embodiments, housing 40 is constructed of a polymeric material that is suitable for remaining submerged in brine for extended periods of time, e.g., at least 1000 hours, without substantial degradation. In a preferred embodiment, housing 40 is made of the same material as bonding plate 38 and/or blank wall 81 (e.g., FIG. 3) and/or nuts 202 and bolts 204 (e.g., FIG. 8), when utilized. In a preferred embodiment, housing 40 is constructed of an aliphatic polyamide (e.g., nylon).

Figure 3:
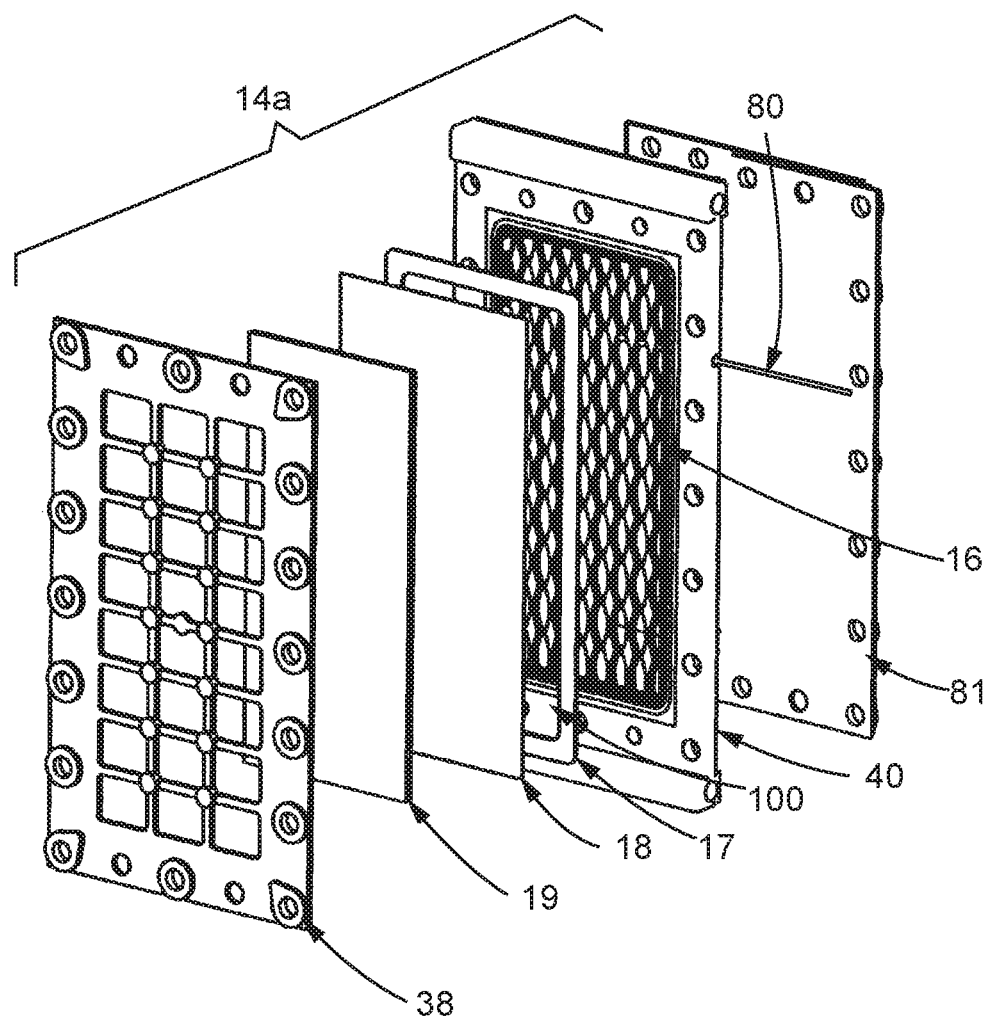
FIG. 3 is an exploded view of an electrolytic cartridge according to the present invention.

FIG. 2 illustrates a "two-sided" cartridge, i.e., a cartridge having membranes disposed on each of the two primary sides of electrode 16. As described herein, an alternate cartridge, e.g., cartridge 14a of FIG. 3, may be constructed so as to have blank wall 81 taking the place of one set of gasket 17, membrane 18, permeable insert 19, and bonding plate 38, thereby sealing one side of electrode 16 from brine, when submerged. The alternate embodiment of FIG. 3 is further described herein. The embodiment of FIG. 2 shows cartridge 14 having electrode 16 having a solid honeycomb-like construction, which aids to provide a uniform electric field intensity. Electrode 16 may have, e.g., a solid plate or dimpled construction, or otherwise constructed to provide current as necessary to perform the electrolytic reactions described herein. Of note, the term "permeable" is used to describe insert 19 insomuch that permeable insert 19 is permeable to brine, i.e., allows brine to pass through. The term "permeable" as used to describe permeable insert 19 is not intended to denote that permeable insert 19 is constructed of membrane material. Various embodiments of permeable insert 19 are further described herein.

Electrode 16 is generally constructed of a conductive substance, which generally is a metal. In certain embodiments the anode, i.e., the positively charged electrode 16, is constructed of a substance that is compatible with aqueous acidic solutions (e.g., acidic electrolyzed water). In a preferred embodiment, the anode is constructed of titanium coated with a mixed metal oxide coating, e.g., a coating of oxides of certain metals. In certain embodiments, the mixed metal oxide coating comprises oxides of tantalum, ruthenium, and iridium.

In certain embodiments of the cathode, i.e., the negatively charged electrode 16 is constructed of a conductive substance that is compatible with aqueous alkaline solutions. In a preferred embodiment, the cathode is constructed of titanium or an alloy thereof.

Each cartridge 14 includes housing 40 that provides a structure to which electrode 16, gaskets 17, membranes 18, permeable inserts 19, and bonding plates 38 can be attached. To facilitate the sealing of membranes 18 to cartridge 14, housing 40 has a generally window like configuration and is constructed in such a manner that when membranes 18 and electrode 16 are connected thereto via, e.g., gasket 17, space 100 is provided so as to contact and be located adjacent to electrode 16 (e.g., between electrode 16 and membranes 18). FIGS. 2a-2c show a cross-sectional view of an assembled cartridge 14 having spaces 100 surrounded by electrode 16, gaskets 17, membranes 18, and permeable inserts 19. For the embodiment illustrated in FIGS. 2a-2c, two pairs of permeable inserts 19 are shown (total of four permeable inserts 19). Cartridges 14 and 14a, as illustrated in FIGS. 2-3, permit the flow of water through space 100, into which ions can be drawn to produce, e.g., aqueous alkaline solution (e.g., alkaline electrolyzed water) or aqueous acidic solution (e.g., acidic electrolyzed water).

Of note, spaces 100 are shown in three distinct sections in the cross-sectional view of FIG. 2c, but the three distinct spaces 100 of the embodiment of FIG. 2c are actually one continuous space adjacent to electrode 16. The center space 100 represents the space between the honeycomb-like structure of electrode 16, and only one portion of electrode 16 is shown in FIG. 2c. If electrode 16 was solid, center space 100 would be part of the electrode, and the flanking spaces 100 would represent the spaces adjacent to electrode 16.

The terms "aqueous solution" and aqueous chemical solution are used herein to describe a water-containing liquid that is produced by a cartridge, cell, system or method disclosed herein (e.g., acidic electrolyzed water and alkaline electrolyzed water), or will become so (e.g., fresh water, any intermediate substance entering, contained in, or leaving space 100). Though brine is an aqueous solution in the general sense of the term, brine is not an "aqueous solution" or an "aqueous chemical solution" as referenced in this application.

When cartridge 14 is submerged in brine, ions are drawn from the brine into space 100 of cartridge 14 by the charge associated with electrode 16. Membranes 18 are selectively permeable for certain species of ions as described herein. Space 100 is located adjacent to electrode 16 so as to contact the surface of electrode 16, i.e., located between membranes 18 and electrode 16. Space 100 is sealed such that, when submerged in brine, the only flow path of ions into space 100 is via a membrane 18, thus only a certain species of ions (i.e., either positively charged ions or negatively charged ions) can pass into space 100 for a particular cartridge 14.

As illustrated in the figures, housing 40 is designed to limit the points of contact between housing 40 and electrode 16, and also between housing 40 and the respective membranes 18, thereby defining space 100 adjacent to electrode 16, e.g., in the area between membranes 18 and electrode 16, or for cartridge 14*a*, in the area between membrane 18 and blank wall 81 (see FIG. 3). Advantageously, ions attracted toward (and through) membranes 18 are largely unobstructed by housing 40, permeable insert(s) 19, and bonding plate(s) 38, such that the ions readily travel through or around each component exterior to membranes 18, into space 100, and to the surface of electrode 16, thereby reacting to form the respective aqueous chemical solution. As described herein, membranes 18 do not contact electrode 16 during operation.

An important feature of electrolytic cartridges 14 and 14*a* relates to space 100 being sealed. As shown in FIG. 2, disposed on each side of electrode 16 and housing 40 is a pair of gaskets 17, followed by a pair of membranes 18, followed by a pair of bonding plates 38. Gaskets 17 provide a seal between electrode 16 and membrane 18, thereby defining space 100. Gaskets 17 are utilized to assist in sealing membranes 18 in a flat, smooth manner across space 100. It has been found that wrinkling of membrane 18 during assembly or operation affects efficiency of cartridge 14. Gaskets 17 aid in assembling cartridge 14 by sealing space 100 even for "wet" assembly. What is meant by "wet" assembly is that the membranes are soaked in water prior to assembly. Soaking the membranes causes the membranes to expand to their final size, which is larger than their "dry" size. "Dry" assembly leads to the membranes expanding once submerged, which leads to a wavy membrane surface, thereby causing inefficiencies in production of the aqueous chemical solutions described herein. Assembling the cartridge using fully-expanded membranes allows for increased efficiency as compared to membranes that are not fully-expanded prior to assembly.

In certain embodiments, gaskets 17 are from about 0.8 mm to about 1.2 mm thick prior to assembly. During operation, housing 40, gasket 17, and membrane 18 provide space 100 so as to have a distance from electrode 16 to membrane 18 of from about 0.1 mm to about 0.6 mm, depending on several factors. Generally, cartridges having positively charged electrodes will have a distance from electrode 16 to membrane 18 of about 0.1 mm to about 0.3 mm, and cartridges having negatively charged electrodes will have a distance from electrode 16 to membrane 18 of about 0.3 mm to about 0.6 mm. In a preferred embodiment, the distance from electrode 16 to membrane 18 is independently adjustable for each cartridge 14.

In certain embodiments, gaskets 17 comprise, consist essentially of, or consist of an elastomer that is compatible with brine, acidic aqueous solutions, and alkaline aqueous solutions. Exemplary embodiments of suitable elastomers include, but are not limited to, isoprene (e.g., natural rubber), isobutylene isoprene copolymer (e.g., butyl rubber) ethylene propylene diene monomer (M-class) rubber ("EPDM"), fluoroelastomers, silicones, so long as the selected elastomer can withstand without substantial degradation the particular ionic species that contacts it when submerged in brine solution. In a preferred embodiment, the elastomer is silicone.

In certain preferred embodiments, gaskets 17 comprise a side at least partially coated with an adhesive, which in certain embodiments is capable of adhering a surface to a wet article. When utilized, the adhesive generally does not function to seal space 100, but to aid in wet assembly of cartridge 14. The adhesive allows the soaked membrane to adhere to the gasket. The adhesive allows for adherence of wet articles to one another, thus facilitating tightening of cartridge 14 without substantial slippage of the gasket and membrane. Examples of adhesives that are capable of adhering a surface to a wet article include, but are not limited to, acrylic adhesives and polyurethane adhesives. In certain preferred embodiments, the adhesive is an acrylic adhesive.

Cartridges 14 having negatively charged electrodes 16 are equipped with positive ion exchange membranes 18, i.e., cation selective membranes. In certain embodiments, cation selective membranes allow alkali ions to pass through. In a preferred embodiment, the cation selective membrane(s) allow sodium ions to pass through. In a preferred embodiment, the cation selective membrane(s) is/are constructed of a sulfonated tetrafluoroethylene based fluoropolymer-copolymer. Cation selective membranes can be obtained from, e.g., E. I. du Pont de Nemours and Company, Wilmington, Del.

Cartridges 14 having positively charged electrodes 16 are equipped with negative ion exchange membranes 18, i.e., anion selective membranes. In certain embodiments, anion selective membranes allow, among others, halide ions to pass through. In a preferred embodiment, the anion selective membrane(s) allow, among others, chloride and/or chlorate ions to pass through. In a preferred embodiment, the anion selective membrane(s) are constructed of a polytetrafluoroethylene cloth having a sulfonated tetrafluoroethylene coating. Anion selective membranes can be obtained from, e.g., Membranes International, Ringwood, N.J. According to a preferred embodiment, membranes 18 have a rigid yet porous structure.

Another important feature of electrolytic cartridges 14 and 14*a* relates to the ability of brine and electrical current to travel to membranes 18. As shown in FIG. 2, continuing outward from electrode 16, beyond the pair of membranes 18 is a pair of permeable inserts 19. Incorporation of permeable inserts 19 assists in allowing more outer surface of membranes 18 to be exposed to brine than in the absence of permeable inserts 19.

The size and/or quantity of permeable insert 19 may vary from cartridge to cartridge. In a preferred embodiment, cartridge 14 having a positively charged electrode 16 further comprises, inter alia, permeable insert 19 disposed between membrane 18 and bonding plate 38, wherein permeable insert 19 has the dimensions of approximately 2.5 inches by 5.5 inches by $\frac{1}{16}$ inch (i.e., approximately 63.5 mm by approximately 139.7 mm by approximately 1.6 mm) prior to tightening of the components that form cartridge 14.

In certain embodiments of the electrolytic cartridge, permeable insert 19 is constructed of a material that allows for passage of brine through the permeable insert to the surface of the respective membrane. In certain embodiments, the permeable insert is constructed of an open-cell foamed polymer. Exemplary monomers that may be polymerized and utilized to form the open-cell foamed polymer include, but are not limited to, isocyanate, ethylene, propylene, styrene, an epoxide (e.g., propylene oxide, 1,2-butylene oxide, epochlorohydrin, and the like), and combinations thereof (e.g., copolymers, terpolymers, polymer blends, etc.). In a preferred embodiment, the open-cell foamed polymer comprises polyurethane. The word "polymer" is used herein to refer to any one or a combination of homopolymers, copolymers, terpolymers, and any molecule that comprises at least three repeating units. Regardless of the monomer selected, the open-cell foamed polymer must allow brine to pass through itself to the membrane surface.

In certain embodiments, the open-cell foamed polymer is coated with a coating substance. The coating substance may be applied, e.g., by dipping the open-cell foamed polymer into a liquid form of the coating substance as known by those skilled in the art. While certain embodiments of the permeable insert may be constructed of uncoated open-cell polymer foam, certain other embodiments comprise a coating substance. The coating substance can be applied, as necessary, to protect the open-cell foamed polymer from degradation that may be caused by brine. Ideally, the coating substance, when utilized, will enhance the transport of brine from the bath to the membrane while protecting the open-cell foamed polymer from degradation that may be caused by the ionic nature of the brine. Exemplary coating substances include, but are not limited to, polyvinyl chloride ("PVC"), chlorinated polyvinyl chloride ("CPVC"), polyvinyldiene fluoride ("PVDF"), polytetrafluoroethylene ("PTFE"), ethylene vinyl acetate copolymer ("EVA"), ethyl methyl acrylate copolymer ("EMA"), and combinations thereof. In a preferred embodiment, the coating substance is polyvinyl chloride.

Bonding plates 38 are disposed on the outer surface of each of the permeable inserts 19 as shown in FIG. 2, or outer permeable inserts if multiple permeable inserts are utilized. In this embodiment, when cartridges 14 are assembled together in a series (see, e.g., FIGS. 4-8). Bonding plates 38 can provide a window pane-like configuration with legs extending around the perimeter of the respective membrane 18 and cross-members that extend between two of the legs so as to define open spaces between permeable inserts 19 and membranes 18 of adjacent cartridges (see, e.g., FIGS. 5 and 6). Membrane 18 should be attached to each housing 40 so that membrane 18 is essentially touching electrode 16 when space 100 is empty. Membrane 18 should separate to a distance within the range of distances described herein when in operation.

Referring to FIG. 3, an alternate embodiment of cartridge is shown as cartridge 14a. Cartridge 14a comprises an electrode and a housing as in FIG. 2, but blank wall 81 is disposed on one side of electrode 16 and housing 40 in place of the gasket, membrane, permeable insert, and bonding plate of cartridge 14 of FIG. 2. Unless the context clearly indicates otherwise, the terms "cartridge" and "electrolytic cartridge" are used generically herein.

Figure 5:
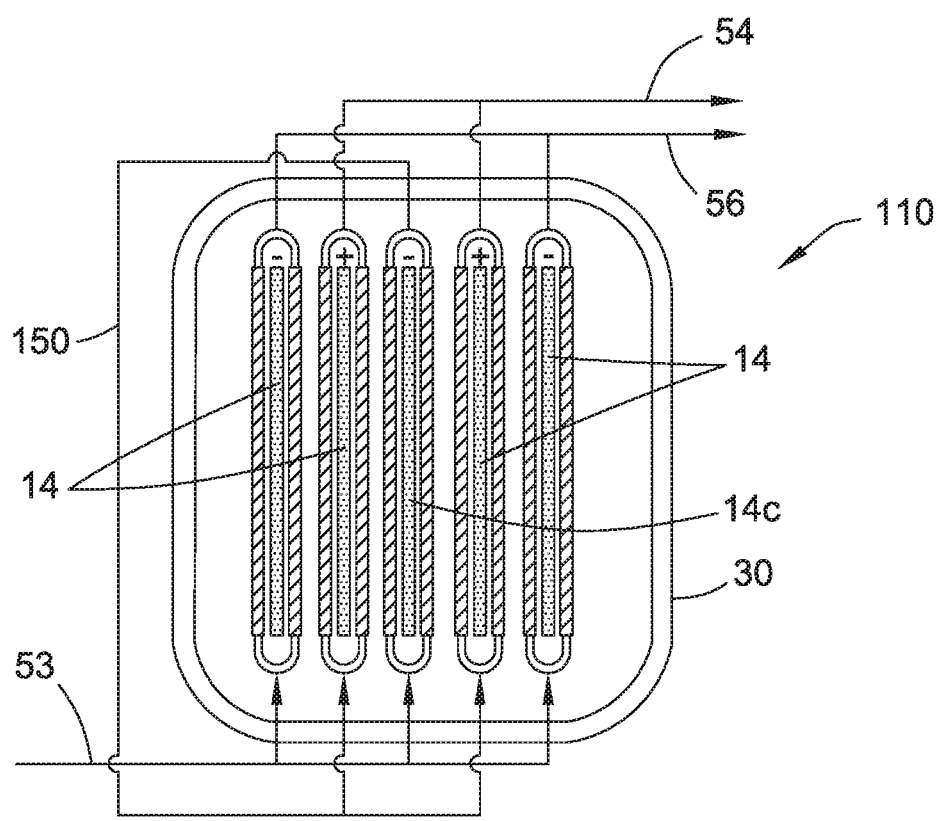
FIG. 5 is a schematic drawing of a more specific exemplary embodiment of an electrolyzing system according to the present invention.
Figure 6:
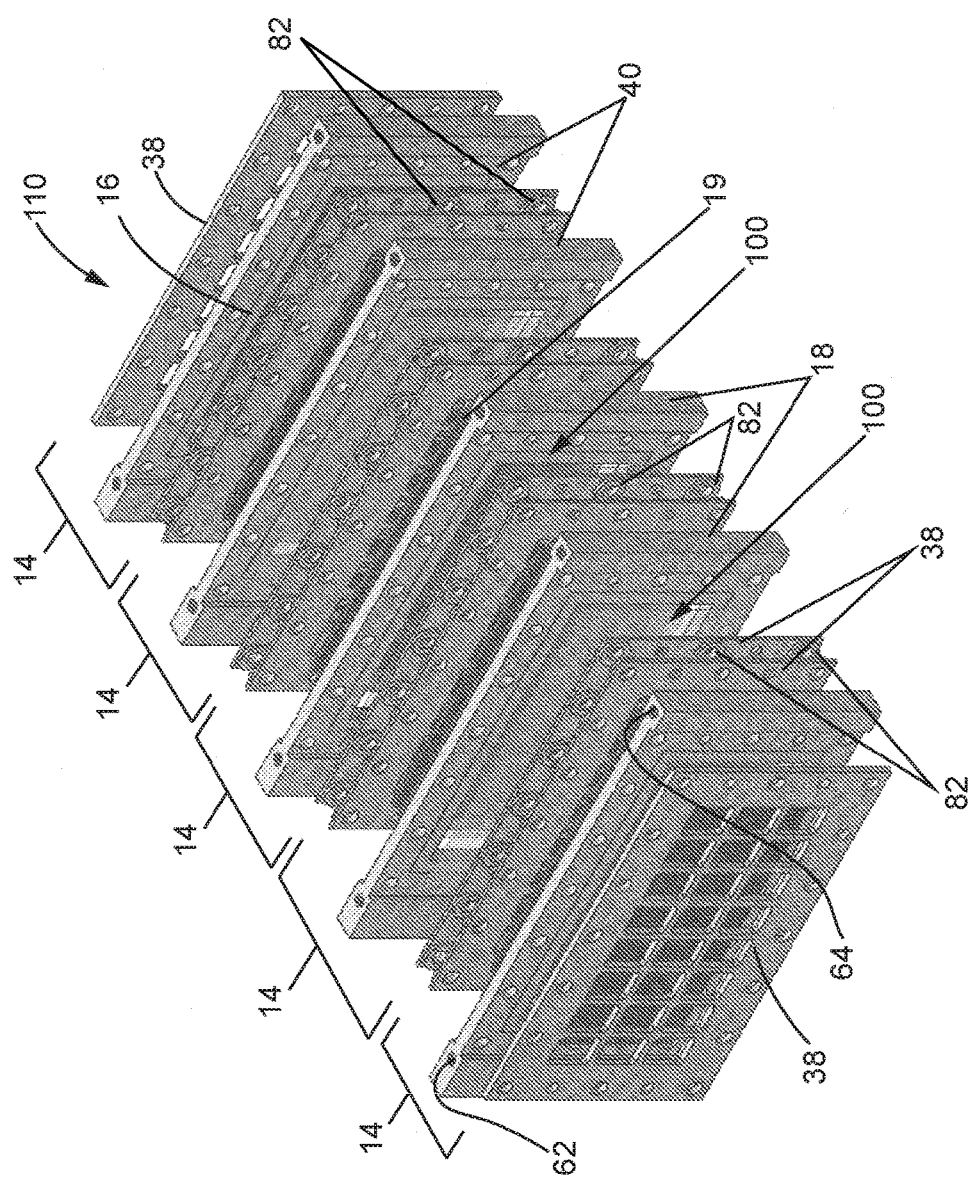
FIG. 6 is an exploded view of the series of electrolytic cartridges of the electrolyzing system of FIG. 5.
Figure 7:
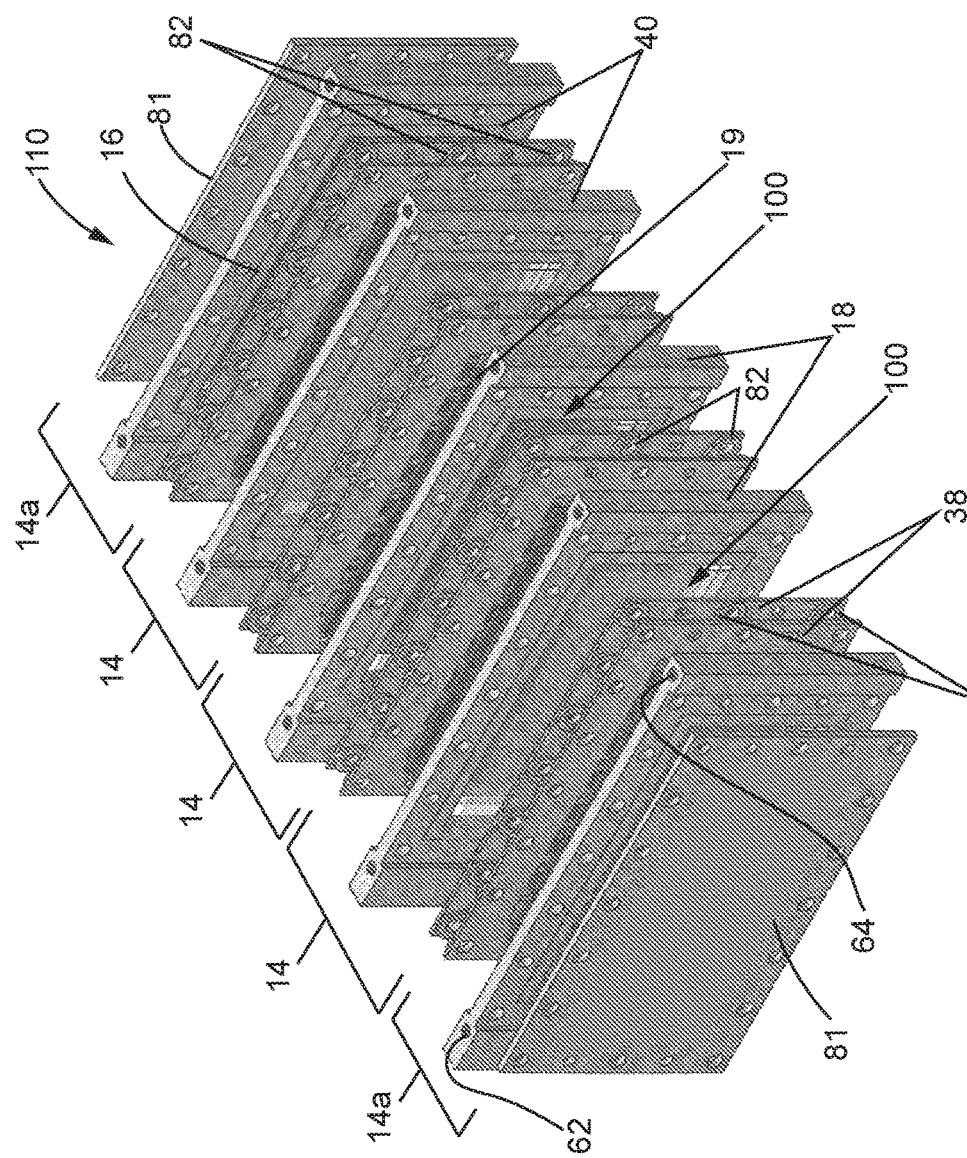
FIG. 7 is another exploded view of a series of electrolytic cartridges of an alternate electrolyzing system.

To facilitate the flow of aqueous solution through space 100 of cartridge 14, each cartridge 14 includes fresh water distribution channel 62 (see FIGS. 6 and 7). Fresh water distribution channel 62 communicates with space 100 adjacent to electrode 16 via series of passages that extend through housing 40 from distribution channel 62 and communicate with space 100 located adjacent to electrode 16. Similar passages can be provided at the opposing end of housing 40 to allow the appropriate aqueous chemical solution to pass into chemical collection chamber 64 (see FIGS. 6 and 7) extending through the opposite edge of housing 40. Ideally, cartridges 14 will be arranged so as to have fresh water distribution channel 62 at a lower edge of cartridge 14, facilitating upward flow of fresh water (or aqueous alkaline solution for certain embodiments, e.g., embodiments of FIGS. 4 and 5), and out the chemical collection chambers 64.

Fresh water distribution channel 62 for at least cartridges 14 having negatively charged electrodes 16 is in communication with fresh water inlet 50 (e.g., FIG. 2). Likewise, chemical collection channel 64 for each cartridge 14 is in communication with outlet 52, as also shown in, e.g., FIG. 2. As each cartridge 14 has its own fresh water distribution channel 62 and chemical collection chamber 64, each cartridge can be considered to be self-contained in that it merely needs to be immersed in a brine bath, appropriately charged, and connected to one or more fresh water sources and chemical outlets, as long as at least two cartridges are present, with one of the cartridges having a positively charged electrode and the other cartridge having a negatively charged electrode. However, multiple cartridges of each may be included in a particular system, and an equal number of each may not be present. As described herein, a preferred embodiment includes a greater number of cartridges having negatively charged electrodes than cartridges having positively charged electrodes. In a further preferred embodiment, fresh water distribution channel 62 of cartridge 14 having a positively charged electrode 16 distributes aqueous alkaline solution into space 100 to react and form aqueous acidic solution having a pH of from about 4 to about 6.

While the figures provide illustrations of embodiments showing fresh water being introduced and aqueous chemical solution drawn off at opposite ends of cartridges 14, the cartridges could be configured such that water is introduced and aqueous chemical solution is drawn off from the same end of the cartridges.

While the embodiments of the figures show cartridges having rectangular configurations, and the corresponding electrode, housing, gaskets, membranes, permeable inserts, and bonding plates have rectangular configurations as well, those skilled in the art will appreciate that other configurations could also be used. According to one preferred embodiment, the combination of the electrodes and the membranes can be approximately 20 mm thick, and the membranes can be approximately 0.46 mm thick and be able to withstand an 80 psi pressure differential across the membrane. The precise distances between the membrane(s) and electrode of a given cartridge and the membranes and electrodes of adjacent cartridges can be optimized through the sizing of the housings, the permeable inserts, the bonding plates, and any spacers (e.g., spacers 82 of FIGS. 6-8) therebetween to reduce energy loss from resistive losses in the fluids.

Experimental results presented in the Example herein show that cartridge 14, which utilizes one or more permeable inserts 19, improves production efficiency as compared to cartridges that do not include permeable inserts. In particular, the production rate of acidic electrolyzed water and alkaline electrolyzed water for cartridges utilizing permeable inserts as described herein can be maintained at a rate equal to that of cartridges that do not utilize permeable inserts while requiring significantly less electrical power to achieve said production rate. For example, a system utilizing the inventive cartridges 14 has shown a two-fold increase in production rate of acid electrolyzed water when supplied with ⅓ the electrical power (i.e., DC power, wattage), thereby achieving an approximate 600% improvement over the previous technology. The results, provided in the Example herein, are surprising and unexpected.

As is understood by those skilled in the art, minimizing the amount of salt in space 100, particularly related to the production of acidic electrolyzed water, e.g., aqueous hypochlorous acid solution, extends the shelf life of the resultant acid sanitizer product (e.g., acidic electrolyzed water) and reduces equipment damage due to corrosion.

Figure 4:
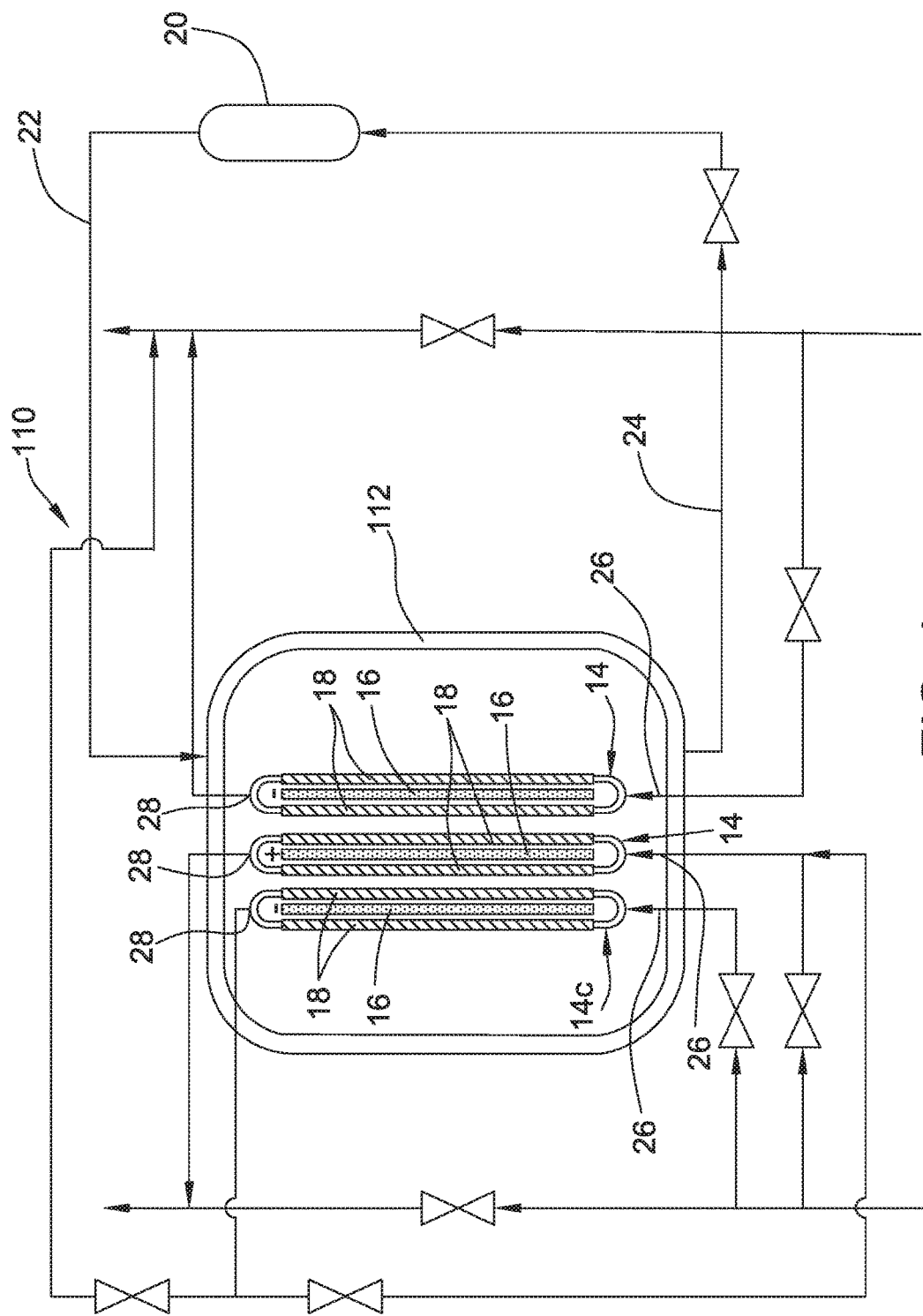
FIG. 4 is a schematic drawing of an exemplary electrolyzing system according to the present invention.

Referring to FIG. 4 of the drawings, there is shown an illustrative embodiment of an electrolyzing system 110 constructed in accordance with the teachings of the present invention. The illustrated electrolyzing system 110 is operable to electrolyze a solution of water and an alkali salt to produce acidic electrolyzed water and/or alkaline (i.e., base) electrolyzed water. Both acidic electrolyzed water (i.e., acid sanitizer) and alkaline electrolyzed water (i.e., base cleaner) have beneficial disinfecting and cleansing properties making them useful in a variety of applications including medical, agricultural, food processing and institutional. According to one embodiment, the water and salt solution is a saline or brine solution comprising water and sodium chloride. Depending on the process conditions, electrolysis of a brine solution comprising water and sodium chloride produces aqueous hypochlorous acid solution (e.g., an acid sanitizer) and aqueous sodium hydroxide solution (e.g., a base cleaner). Note that, though FIGS. 4 and 5 have been drawn to show the fluids flowing to and from cartridges 14 through the walls of and outside of basin 30/brine bath 112, such fluid will generally flow through flexible conduits (e.g., hoses) that are arranged such that the hoses will enter or exit, when necessary, via a top opening of basin 30/brine bath 112. In certain embodiments, lines that recycle the product of a cartridge 14 to a second cartridge(s) 14 (e.g., recycle line 150) are completely contained within basin 30 and can be completely submerged within brine bath 112.

In accordance with an aspect of the present invention, the electrolyzing system 110 incorporates brine bath 112 into which at least one electrolytic cartridge 14 having a positively charged electrode 16 and at least one electrolytic cartridge 14 having a negatively charged electrode 16 are immersed with substantially all sides of cartridges 14 open to the brine. As used herein, an electrolytic cell consists of a pair of electrolytic cartridges 14, with one electrolytic cartridge 14 having a positively charged electrode 16 and the other electrolytic cartridge 14 having a negatively charged electrode 16. The use of an open brine bath 112 with immersed electrolytic cartridges 14 eliminates the need for any obstructive intermediate chamber thereby allowing fluid to flow more freely through the system. It also eliminates the need for complex guides to direct the flow of fluid thereby simplifying the design as well as increasing efficiency. In the schematic drawing of FIG. 4, brine bath 112 includes three cartridges 14, one incorporating a positively charge electrode 16 and two incorporating negatively charged electrodes 16. Cartridges 14 are configured to electrolyze the brine in bath 112 and thereby draw in positively and negatively charged ions into respective cartridges 14. In the embodiment of FIG. 4, ion permeable membranes 18 are provided on each side of the electrode 16 in each cartridge 14. Arranging membranes 18 on each side of each electrode 16 allows ions to be drawn into cartridge 14 from both sides of each electrode 16.

In the system of FIG. 4, optional brine supply 20 is provided that is connected to bath 112 via brine supply line 22. Optional brine recirculation line 24 is also provided which draws spent brine out of bath 112 and returns it to brine supply 20. As a result of this arrangement, brine is circulated through bath 112 and around and past the electrolytic cartridges 14. Brine may be supplied to bath 112 via any manner known in the art. As the brine passes the electrolytic cartridges 14, it is subject to an electrolysis reaction with the negatively charged ions being drawn into the cartridge 14 with the positively charged electrode 16 and the positively charged ions being drawn in the cartridge with the negatively charged electrode 16.

Each of electrolytic cartridges 14 has a fresh water inlet 26 (i.e., inlet of the space) that is connected to a supply of fresh water that is directed into space 100 in cartridge 14 between membranes 18 and electrode 16. In cartridge 14, the fresh water mixes with the ions drawn into space 100 of the cartridge 14 to form either aqueous acidic solution (in cartridge 14 with the positively charged electrode 16) or aqueous alkaline solution (in cartridge 14 with the negatively charged electrode 16). Each cartridge 14 has outlet 28 that is connected to a line allowing the respective aqueous chemical solutions (aqueous acidic solution or aqueous alkaline solution) to exit cartridges 14. The flow of the brine, fresh water and aqueous chemical solutions through the system can be controlled as known by those skilled in the art.

Shown in FIG. 4, an important feature of system 110 is the ability to feed the product of a cathode cartridge to the inlet of an electrolytic cartridge having a positively charged electrode 16. In FIG. 4, the outlet of cathode cartridge 14c is configured to supply the product produced by cathode cartridge 14c to the inlet of cartridge 14 having the positively charged electrode 16. The ability to supply such product to cartridge 14 having a positively charged electrode 16 allows for pH control of the product of cartridge 14 having the positively charged electrode 16 regardless of the salinity (or lack thereof) of the fresh water being supplied to system 110, or hardness of fresh water being supplied to a water softener, the output of which may be supplied to system 110.

To enable the system to be easily scaled to a desired production rate of aqueous acidic solution and/or aqueous alkaline solution, electrolytic cartridges 14 can have a modular design, for example, each cartridge may be configured such that multiple cartridges 14 can attach to one another. This permits the system to be scaled to a desired production rate by adding or subtracting additional cartridges and/or cells. Illustrative embodiments of systems including such modular cartridges 14 are shown in FIG. 1 and FIGS. 4-8. For example, the diagrams of FIGS. 5-8 include a total of five electrolytic cartridges 14 (three negatively charged and two positively charged).

Referring to FIG. 5, cartridges 14 are received in basin 30 that defines a brine bath (e.g., brine bath 112 of FIG. 4). While the embodiment of FIG. 5 illustrates five cartridges, it will be understood that the more or less cartridges could be provided. For example, a system with only three cartridges (e.g., FIG. 4) could be provided that had either a 2:1 aqueous acidic solution to aqueous alkaline solution production rate or a 2:1 base to acid production rate. In the embodiment of FIG. 5, the system comprises, inter alia, a quantity of cartridges having negatively charged electrodes that is one greater than the quantity of cartridges having positively charged electrodes. In the embodiment of FIG. 5, the system is constructed and arranged such that an outlet of one of the cartridges having a negatively charged electrode (e.g., cathode cartridge 14c) is in communication with fresh water inlet 50 (e.g., FIG. 2) and fresh water distribution channel 62 (e.g., FIGS. 6 and 7) of at least one of cartridges 14 having a positively charged electrode. In an even further preferred embodiment, as illustrated in FIG. 5, fresh water is not supplied to spaces 100 of cartridges 14 having positively charged electrodes, but instead the product of at least one cathode cartridge 14c having a negatively charged electrode supplies fresh water inlets 50 and fresh water distribution channels 62, and thereby spaces 100, of the cartridges having positively charged electrodes, e.g., via recycle lines 150. Typically, adjacent cartridges 14 have one positively charged electrode 16 and one negatively charged electrode 16, so that during operation, the positively charged ions flow through membrane 18 of one cartridge 14 toward negatively charged electrode 16 and the negatively charged ions would flow through membrane 18 of adjacent cartridge 14 toward positively charged electrode 16. In the embodiment of FIG. 5, the cartridges are independently submerged in a brine bath.

With continuing reference to FIG. 5, the inletting fresh water is shown by arrow 53. Fresh water is directed into space 100 of each individual electrolytic cartridge 14 having negatively charged electrodes, wherein the fresh water mixes with the positively charged ions drawn through membranes 18 to form aqueous alkaline solution. In the embodiment of FIG. 5, the outletting aqueous acidic solution is referenced with arrow 56 and the outletting aqueous alkaline solution is referenced with arrow 54, with recycled aqueous alkaline solution is referenced with arrow 150. In this case, each aqueous chemical solution flows upward from the bottoms of respective cartridges 14 and exits at the tops of cartridges 14. The flow of aqueous solution through space 100 of cartridges 14 is shown diagrammatically with arrows in FIG. 5, with the flow of water shown with arrows 53, the flow of aqueous alkaline solution shown with arrows 54 and 150, and the flow of aqueous acidic solution shown with arrows 56. In FIG. 5, center cartridge 14c is a "cathode cartridge" as described herein, with its outlet in communication with each of cartridges 14 having positively charged electrodes. In certain embodiments, direct current electricity supplied to the center cartridge of FIG. 5 is supplied via an adjustable electrical supply.

Referring to FIGS. 6 and 7 of the drawings, a pair of exploded views is provided that shows the construction of a series of cartridges 14. In this case, each cartridge 14 includes an electrode 16 that is either positively or negatively charged. As shown in FIG. 2, each electrode 16 has an attached lead 80 that can be connected to a suitable electrical supply. Returning to FIG. 6, while certain embodiments of electrode 16 have a flat, solid construction as discussed herein, certain embodiments of electrode 16 utilize a honeycomb-like structure featuring a plurality of openings, and certain other embodiments of electrode 16 utilize a non-flat, e.g., dimpled, configuration. Such constructions can have the advantage that they may introduce turbulence into the flow of fresh water adjacent to electrode 16, i.e., in space 100 and in contact with electrode 16. While not wishing to be bound by theory, it is believed that turbulence may increase the efficiency of the system. Furthermore, a higher flux and/or flow rate of water through cartridges 14 having a positively charged electrode 16 versus those cartridges 14 having a negatively charged electrode 16 is believed to facilitate improved control in the chemical reaction that creates the acid sanitizer.

FIG. 7 illustrates an alternate embodiment having the two outermost cartridges 14 each have only one membrane 18 with blank walls 81 provided on the other side of each cartridge 14 to define the edge of the series of cartridges. To ensure adequate spacing is provided between adjacent cartridges 14 as well as to support membranes 18, permeable inserts 19 and bonding plates 38 can be provided on the outer surface of each membrane 18 (see, e.g., FIG. 2). Bonding plate 38 enables each cartridge 14 to be arranged together with an immediately adjacent similarly constructed cartridge 14 to create the series of two or more cartridges. Bonding plate 38 has a window-like configuration with a plurality of large openings through which brine can access permeable inserts 19 and membranes 18. In these embodiments, spacers 82 are arranged on an outer face of every other bonding plate 38 in the series and engage the outer face of bonding plate 38 of the adjacent cartridge 14 so as to create space between adjacent cartridges 14, thereby allowing brine to occupy the spaces between cartridges 14.

To provide precise control of formation of the appropriate aqueous chemical solution in cartridges 14, including the desired pH, water flow through spaces 100 between membranes 18 and electrode 16 can be regulated with an appropriate control system, which in certain embodiments includes recycling aqueous alkaline solution produced by a cartridge having a negatively charged electrode into space 100 of a cartridge having a positively charged electrode. For example, if the electrolyzing system is configured to electrolyze a brine solution of sodium chloride and water, the control system can be used to regulate water flow and electrical current so as to control the formation of aqueous acidic solution and aqueous alkaline solution at the desired production rate and at the desired pH. The same or a different control system can be used to control the supply of brine in the bath, including providing replenishment of the supply of brine in the bath during operation. The control system can include pumps for the water and brine, valves and suitable electronic controls.

In a preferred embodiment, the electrolyzing system 110 comprises two electrolytic cartridges having positively charged electrodes and three electrolytic cartridges having negatively charged electrodes, in alternate arrangement (i.e., arranged negative-positive-negative-positive-negative). In this preferred embodiment, the center cartridge is a cathode cartridge as described herein. The cathode cartridge is capable of operation to produce an aqueous alkaline solution at a pH of from about 11.5 to about 12.5, and the outlet is in communication with each of the fresh water inlet and fresh water distribution channel of each of the cartridges having positively charged electrodes.

Figure 8:
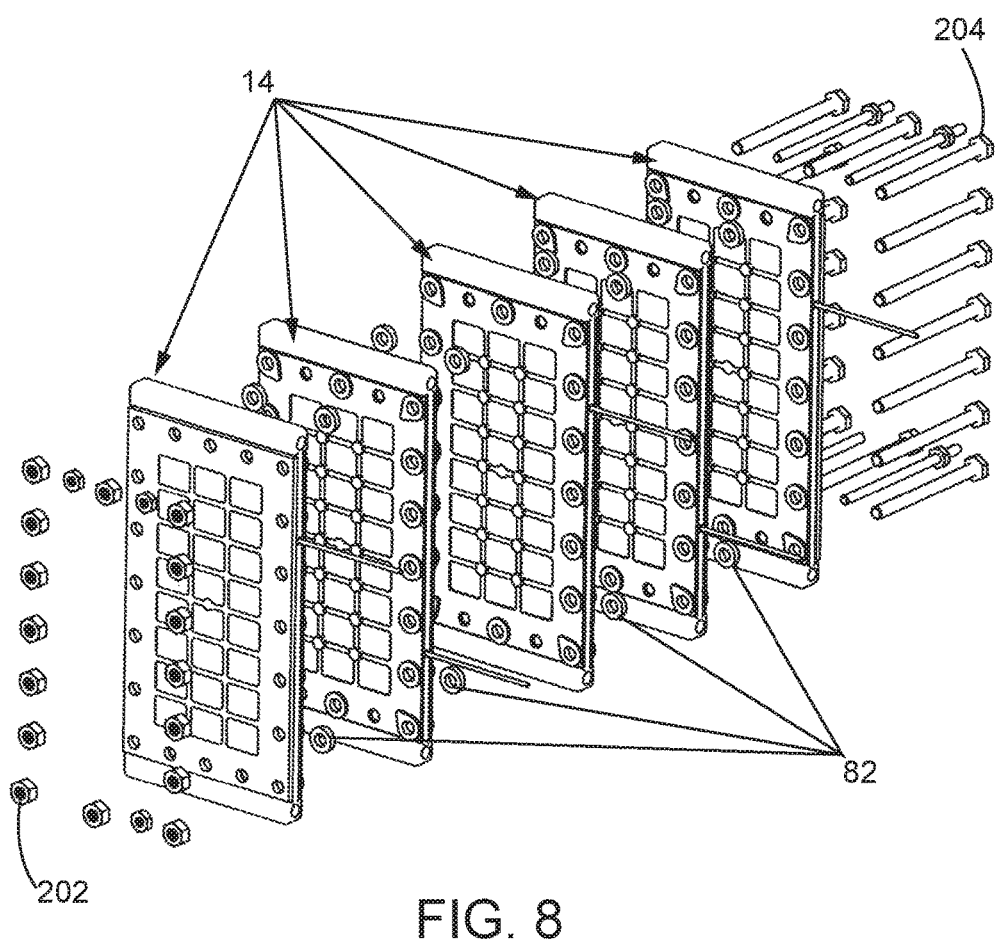
FIG. 8 is an exploded view of the series of electrolytic cartridges of FIG. 6 assembled using nuts and bolts.

Referring to FIG. 8, in preferred embodiments, cartridge 14, or a series thereof, is assembled using screw-type fasteners, e.g., nuts 202 and bolts 204. In certain embodiments, nuts 202 and bolts 204 are tightened to a torque of from about 0.3 N*m to about 0.5 N*m (i.e., about 3 lb*in to about 4 lb*in).

A method of producing acidic electrolyzed water and alkaline electrolyzed water from a brine solution comprising cations and anions is provided. The method comprises immersing a first electrolytic cartridge, a second electrolytic cartridge, and a cathode cartridge in the brine solution. The first electrolytic cartridge comprises a first electrode connected to an electrical supply that positively charges the first electrode. The first electrolytic cartridge further comprises an anion selective membrane that is supported relative to the first electrode so as to define a first space adjacent to at least a portion of the first electrode. The first space is sealed from the brine solution such that the only path for the anions of the brine solution to enter the first space is through the anion selective membrane. The second electrolytic cartridge comprises a second electrode connected to an electrical supply that negatively charges the second electrode. The second electrolytic cartridge further comprises a cation selective membrane that is supported relative to the second electrode so as to define a second space adjacent to at least a portion of the second electrode. The second space is sealed from the brine solution such that the only path for the cations of the brine solution to enter the second space is through the cation selective membrane. The cathode cartridge, which is also an electrolytic cartridge, comprises a third electrode connected to an electrical supply that negatively charges the third electrode. The cathode cartridge further comprises a cation selective membrane that is supported relative to the third electrode so as to define a third space adjacent to at least a portion of the third electrode. The third space is sealed from the brine solution such that the only path for the cations of the brine solution to enter the third space is through the cation selective membrane. Fresh water is flowed through the first, second, and third spaces while the first, second, and third electrodes are charged, thereby creating a first product, a second product, and a third product flowing from each respective space. At least a portion of the third product is flowed through the first space while at least the first and second electrodes are charged, thereby adjusting the pH of the first product.

Yet another method is provided. The method comprises producing aqueous alkaline solution via an electrolytic cartridge submerged in a brine solution and having a negatively charged electrode. At least a portion of the aqueous alkaline solution produced by the electrolytic cartridge having the negatively charged electrode is fed to an electrolytic cartridge submerged in the brine solution and having a positively charged electrode. Aqueous hypochlorous acid solution having a pH of from about 4 to about 6 is produced via the electrolytic cartridge submerged in the brine and having the positively charged electrode.

In certain embodiments, the inventive methods comprise utilizing one or more of the cartridges or systems disclosed herein. For example, in certain embodiments, the method comprises, inter alia, utilization of cartridges that employ a single ion selective membrane per cartridge (cation or anion, but not both), or multiple ion selective membranes per cartridge (cation or anion, but not both), or combinations thereof.

In certain embodiments, at least a portion of a third product (i.e., aqueous alkaline solution) is flowed through each first space 100 (i.e., space 100 adjacent to a positively charged electrode 16 of cartridge 14), thereby adjusting the pH of each first product (i.e., aqueous acidic solution). In certain embodiments, the third product has a pH of from about 11.5 to about 12.5, which, in a preferred embodiment, the alkali hydroxide is sodium hydroxide.

In certain embodiments, the method comprises a plurality of first electrolytic cartridges immersed in the brine solution, a plurality of second electrolytic cartridges immersed in the brine solution, or both a plurality of first and second electrolytic cartridges immersed in the brine solution.

In certain embodiments, the brine solution comprises water and an alkali halide salt. In a preferred embodiment, the brine solution comprises water and sodium chloride. In a preferred embodiment, the brine solution is saturated with sodium chloride, i.e., approximately 26% sodium chloride by weight in water at room temperature.

In certain embodiments, the second and third products are alkaline electrolyzed water, which in certain preferred embodiments is aqueous sodium hydroxide solution. In certain embodiments, the first product is acidic electrolyzed water, which in certain preferred embodiments is aqueous hypochlorous acid solution. In certain preferred embodiments, the acidic electrolyzed water (e.g., aqueous hypochlorous acid solution) has a pH of from about 4 to about 6. In certain embodiments where the first product is aqueous hypchlorous acid, the aqueous hypochlorous acid solution has a hypochlorous acid concentration of from about 100 ppm to about 300 ppm by weight.

In certain embodiments, the first and second spaces are arranged so as to have a second space (i.e., space 100 adjacent to a negatively charged electrode 16 of cartridge 14) to first space (i.e., space 100 adjacent to a positively charged electrode 16 of cartridge 14) volumetric ratio of from about 2:1 to about 10:1.

In certain embodiments, the first product is acidic electrolyzed water having an acid concentration of from about 100 ppm to about 300 ppm and is produced at a rate of from about 10 mL/min per Watt of DC electrical power to about 40 mL/min per Watt of DC electrical power.

EXAMPLE

Experiments were performed utilizing a four-cartridge system of the "old" construction ("the old system") versus a five-cartridge system of the inventive cartridges as illustrated in FIG. 5, which constitutes a preferred embodiment of the invention ("the new system"). Each system utilized a saturated brine bath comprising water and sodium chloride, and the experiments were conducted at ambient room temperature.

The old system comprised four cartridges that were assembled "dry" without gaskets and did not include the permeable inserts as described herein. The cartridges of the old system were arranged so as to have alternating electrode charge and included open side plates, i.e., no cross-members on each of the outer sides of the end cartridges. Water having 20 grain hardness was input into a softener, and the output of the softener was input into the space adjacent to the electrode of each cartridge. The softened water was input into the cartridges having positively charged electrodes at an overall rate of approximately 1.5 L/min, and into the cartridges having negatively charged electrodes at an overall rate of approximately 0.9 L/min. Acidic electrolyzed water having a pH of approximately 2.3 and a hypochlorous acid concentration of approximately 85 ppm was produced by the cartridges having positively charged electrodes at the given flow rates, with 7.5 amperes of current flowing through the system. In order to achieve the 7.5 amperes of current, 26.5 Volts direct current was supplied to the electrodes, i.e., 199 Watts of DC power.

In contrast, the new system comprised five cartridges that were assembled "wet," including silicone gaskets, permeable inserts, and bonding plates as described herein. The cartridges of the new system were arranged so as to have alternating electrode charge, with the center cartridge having a negatively charged electrode. The product of the center cartridge supplied all incoming liquid to the adjacent cartridges having positively charged electrodes (e.g., the configuration illustrated in FIG. 5).

The new system was tested using water having each of 20 grain hardness and 5 grain hardness input into a water softener, which was then input into the space adjacent to the electrode of the cartridges having the negatively charged electrodes. The softened water was input into the two outer cartridges having negatively charged electrodes at an overall rate of approximately 0.9 L/min, and into the center cartridge at a rate of approximately 1.5 L/min, the output of which was fed to the two cartridges having positively charged electrodes. For the 20 grain hardness experiment, acidic electrolyzed water having a pH of approximately 6.5 and a hypochlorous acid concentration of approximately 145 ppm was produced by the cartridges having positively charged electrodes at the given flow rates, with 7.5 amperes of current flowing through the system. In order to achieve the 7.5 amperes of current, only 11 Volts direct current was supplied to the electrodes, i.e., 66 Watts of DC power. For the 5 grain hardness experiment, acidic electrolyzed water having a pH of approximately 5 and a hypochlorous acid concentration of approximately 135 ppm was produced by the cartridges having positively charged electrodes at the given flow rates, with 7.5 amperes of current flowing through the system. In order to achieve the 7.5 amperes of current, again only 11 Volts direct current was supplied to the electrodes, i.e., 66 Watts of DC power. For the new system, given the lower electrical power needed to generate higher concentrations of acidic electrolyzed water at the same flow rate (i.e., increased production rate), the inventive cartridges, systems and methods provide a substantial (e.g., an approximate 600%) improvement over the old cartridges, systems and methods, as demonstrated by the Example provided herein. Of note, though water that was initially reasonably hard and then softened by a water softener provides a preferred source of water to the cartridges (i.e., into the spaces adjacent to the electrodes of the cartridges), the substantial improvement was achieved regardless of the amount of hardness initially present in the source water.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A discrete electrolytic cartridge module for assembly into an electrolytic system in which the cartridge is in a brine solution during operation of the electrolytic system for producing electrolyzed water comprising:
    an electrode connectable to an electrical supply;
    an ion selective membrane disposed on a side of the electrode so as to define a space adjacent to at least a portion of the electrode;
    a permeable insert covering the ion selective membrane on a side opposite the space;
    said permeable insert being made of an open cell foamed polymer that allows the passage of brine solution through the permeable insert to the ion selective membrane;
    a bonding plate disposed on the permeable insert on a side opposite the side facing the ion selective membrane, said space being in communication with a fresh water supply at an inlet of the space and in communication with an outlet of the space, said space being sealed such that when said electrolytic cartridge is submerged in said brine solution the only path for the ions of the brine solution to enter the space is through the ion selective membrane, and
    said bonding plate being formed with openings that permit of passage of the brine solution through said bonding plate and permeable insert to said ion selective membrane while supporting permeable insert and ion selective membrane during direction of fresh water from said inlet into said space.

2. The electrolytic cartridge of claim 1, further comprising a plurality of ion selective membranes, a plurality of permeable inserts, and a plurality of bonding plates, arranged such that, when submerged in a brine solution comprising ions, the only path for the ions of the brine solution to enter the first space is through the ion selective membranes.

3. The electrolytic cartridge of claim 1, further comprising a gasket disposed between the electrode and each ion selective membrane.

4. The electrolytic cartridge of claim 3, wherein each gasket is constructed of an elastomer.

5. The electrolytic cartridge of claim 4, wherein the elastomer of said gasket is silicone.

6. The electrolytic cartridge of claim 4, wherein each gasket comprises a side at least partially coated with an adhesive.

7. The electrolytic cartridge of claim 6, wherein the adhesive is capable of adhering a surface to a wet article.

8. The electrolytic cartridge of claim 6, wherein the adhesive is an acrylic adhesive.

9. The electrolytic cartridge of claim 1, wherein the open-cell foamed polymer comprises polyurethane.

10. The electrolytic cartridge of claim 9, wherein the open-cell foamed polymer is coated with a coating substance.

11. The electrolytic cartridge of claim 10, wherein the coating substance is polyvinyl chloride.

12. The electrolytic cartridge of claim 1, wherein the electrode is constructed of a metal alloy coated with a substance comprising oxides of at least one of tantalum, ruthenium, and iridium.

13. The electrolytic cartridge of claim 1, wherein the space is capable of containing fresh water at a pressure of at least 2 psi for at least 10 minutes without leaking.

14. The electrolytic cartridge of claim 1, wherein the ion selective membrane is an anion selective membrane.

15. The electrolytic cartridge of claim 1, wherein the ion selective membrane is a cation selective membrane.

16. An electrolyzing system for electrolyzing a brine solution of water and ions of an alkali salt to produce acidic electrolyzed water and alkaline electrolyzed water, the system comprising:
a basin comprising an internal chamber for containing the brine solution comprising cations and anions and defining a brine bath;
a first electrolytic cartridge arranged in the internal chamber of the basin with the first electrolytic cartridge immersed in the brine bath,
said first electrolytic cartridge comprising a first electrode that is connected to an electrical supply that positively charges the first electrode, and an anion selective membrane disposed on a side of the first electrode so as to define a first space adjacent to at least a portion of the first electrode and into which anions from the brine solution can enter through the anion selective membranes;
said first space being in communication with a fresh water supply at an inlet of the first space and in communication with an outlet;
said first space sealed from the brine bath such that the only path for the anions of the brine solution to enter the first space is through the anion selective membrane;
a second electrolytic cartridge arranged in the internal chamber of the basin with the second electrolytic cartridge immersed in the brine bath;
the second electrolytic cartridge comprising a second electrode that is connected to an electrical supply that negatively charges the second electrode, and a cation selective membrane disposed on a side of the second electrode so as to define a second space adjacent to at least a portion of the second electrode and into which cations from the brine solution can enter through the cation selective membrane,
a second permeable insert covering the cation selective membrane on a side opposite the second space;
said second space being in communication with a fresh water supply at an inlet of the second space and in communication with an outlet of the second space;
said second space sealed from the brine bath such that the only path for the cations of the brine solution to enter the second space is through the cation selective membrane;
a first permeable insert covering the anion selective membrane on a side opposite the first space made of an open cell foamed polymer that allows the passage of brine solution through the first permeable insert to the anion selective membrane;
a first bonding plate disposed on the first permeable insert on a side opposite the side facing the anion selective membrane, said first bonding plate being formed with openings that permit the passage of brine solution through the first bonding plate and first permeable insert to said anion selective membrane while supporting said permeable insert and first anion selective membrane during the direction of fresh water from said inlet into said first space;
a second permeable insert covering the cation selective membrane on a side opposite the first space made of an open cell foamed polymer that allows the passage of brine solution through the second permeable insert to the cation selective membrane; and
a second bonding plate separate from said first bonding plate disposed on the second permeable insert on a side opposite the side facing the cation selective membrane, said second bonding plate being formed with openings that permit the passage of brine solution through the second bonding plate and second permeable insert to said cation selective membrane while supporting said second permeable insert and cation selective membrane during the direction of freshwater from said inlet into said first space.

17. The electrolyzing system of claim 16, wherein the first electrolytic cartridge further comprises a plurality of anion selective membranes a plurality of permeable inserts, and a plurality of bonding plates, arranged such that the only path for the anions of the brine solution to enter the first space is through the anion selective membranes.

18. A method of producing acidic electrolyzed water and alkaline electrolyzed water from a brine solution comprising cations and anions, the method comprising:
immersing a first electrolytic cartridge in the brine solution, the first electrolytic cartridge comprising a first electrode, the first electrode connected to an electrical supply that positively charges the first electrode, the first electrolytic cartridge further comprising an anion selective membrane, said anion selective membrane being supported relative to the first electrode so as to define a first space adjacent to at least a portion of the first electrode, directing fresh water through said first space with the first space being sealed from the brine solution such that the only path for the anions of the brine solution to enter the first space is through the anion selective membrane;
immersing a second electrolytic cartridge in the brine solution adjacent one side of said first electrolytic cartridge, the second electrolytic cartridge comprising a second electrode, the second electrode being connected to an electrical supply that negatively charges the second electrode, the second electrolytic cartridge further comprising a cation selective membrane, the cation selective membrane being supported relative to the second electrode so as to define a second space adjacent to at least a portion of the second electrode, directing fresh water through said second space with the second space being sealed from the brine solution such that the only path for the cations of the brine solution to enter the second space is through the cation selective membrane;
immersing a third electrolytic cartridge in the brine solution adjacent a second side of the first electrolytic cartridge opposite said first side of said electrolytic cartridge, the third electrolytic cartridge comprising a third electrode, said third electrode being connected to an electrical supply that negatively charges the third electrode, said third electrolytic cartridge further comprising a second cation selective membrane, said second cation selective membrane being supported relative to the third electrode so as to define a third space adjacent to at least a portion of the third electrode, directing fresh water through said third space with the third space being sealed from the brine solution such that the only path for the cations of the brine solution to enter the third space is through the second cation selective membrane;

flowing fresh water through the first, second, and third spaces while the first, second, and third electrodes are charged, thereby creating a first product, a second product, and a third product flowing from each respective space; and controlling the charge of the first electrode and supply of fresh water to the first space separately verses the charge of the second and third electrodes and the supply of water to said second and third spaces; and flowing at least a portion of the third product through the first space while at least the first and second electrodes are charged, thereby adjusting the pH of the first product.

\* \* \* \* \*